US012748246B2

(12) United States Patent
You et al.

(10) Patent No.: US 12,748,246 B2
(45) Date of Patent: Sep. 29, 2026

(54) LENSLESS IMAGING SYSTEM, METHOD OF MANUFACTURING LENSLESS IMAGING SYSTEM, AND ELECTRONIC APPARATUS

(71) Applicant: SAMSUNG ELECTRONICS CO., LTD., Suwon-si (KR)

(72) Inventors: Jang Woo You, Suwon-si (KR); Byong Gwon Song, Suwon-si (KR); Du Hyun Lee, Suwon-si (KR); Se Yoon Kim, Suwon-si (KR); Won Taek Seo, Suwon-si (KR); Yong Seop Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 231 days.

(21) Appl. No.: 18/658,609

(22) Filed: May 8, 2024

(65) Prior Publication Data

US 2025/0189704 A1 Jun. 12, 2025

(30) Foreign Application Priority Data

Dec. 11, 2023 (KR) ........................ 10-2023-0178723

(51) Int. Cl.
*G02B 5/18* (2006.01)
*H04N 23/55* (2023.01)

(52) U.S. Cl.
CPC ......... *G02B 5/1871* (2013.01); *G02B 5/1847* (2013.01); *H04N 23/55* (2023.01)

(58) Field of Classification Search
CPC ........ G02B 5/008; G02B 1/002; G02B 1/007; G02B 26/06; G02B 1/005; G02B 5/1809; G02B 2207/129; G02F 1/292; G02F 2202/30
See application file for complete search history.

(56) References Cited

U.S. PATENT DOCUMENTS 7,888,626 B2 2/2011 Slinger et al.
10,753,869 B2 8/2020 Veeraraghavan et al.
(Continued)

FOREIGN PATENT DOCUMENTS

CN 111652815 A 9/2020
CN 115526792 A 12/2022
(Continued)

OTHER PUBLICATIONS

Ronneberger, Olaf et al., "U-Net: Convolutional Networks for Biomedical Image Segmentation", arXiv:1505.04597v1 [cs.CV], May 18, 2015. (8 pages total).
(Continued)

*Primary Examiner* — Jonathan Y Jung
(74) *Attorney, Agent, or Firm* — Sughrue Mion, PLLC

(57) ABSTRACT

A lensless imaging system includes a coded mask including at least one domain, and an image sensor configured to receive light that passes through the coded mask and generate an electrical signal for image generation based on the received light, where each of the at least one domain includes a plurality of sub-domains provided in a first pattern, each of the plurality of sub-domains includes a second pattern, and the plurality of sub-domains are configured to deflect incident light based on a combination of the first pattern and the second pattern.

20 Claims, 11 Drawing Sheets

(56) References Cited

U.S. PATENT DOCUMENTS

| | | | | |
|---|---|---|---|---|
| 2009/0095912 | A1* | 4/2009 | Slinger | G01T 1/295 250/363.06 |
| 2018/0045953 | A1* | 2/2018 | Fan | G02B 5/18 |
| 2018/0143470 | A1* | 5/2018 | Oh | G02B 5/1809 |
| 2019/0137075 | A1* | 5/2019 | Aieta | B82Y 20/00 |
| 2019/0178796 | A1* | 6/2019 | Veeraraghavan | G02B 21/367 |
| 2021/0314546 | A1 | 10/2021 | Choi et al. | |
| 2021/0337140 | A1* | 10/2021 | Siddique | G01J 5/0801 |
| 2022/0082815 | A1* | 3/2022 | Mun | G02B 5/1876 |
| 2023/0111183 | A1 | 4/2023 | Lee et al. | |
| 2024/0310283 | A1 | 9/2024 | McLeod et al. | |
| 2024/0320495 | A1 | 9/2024 | Sato et al. | |

FOREIGN PATENT DOCUMENTS

| | | | |
|---|---|---|---|
| JP | 2021-57848 | A | 4/2021 |
| KR | 10-2021-0124041 | A | 10/2021 |
| KR | 10-2022-0096491 | A | 7/2022 |
| KR | 10-2023-0051392 | A | 4/2023 |
| KR | 10-2023-0085797 | A | 6/2023 |
| KR | 10-2023-0113110 | A | 7/2023 |
| WO | 2018/023039 | A1 | 2/2018 |
| WO | 2023/287677 | A1 | 1/2023 |
| WO | 2023/106252 | A1 | 6/2023 |

OTHER PUBLICATIONS

Pan, Xiuxi et al., "Image reconstruction with transformer for mask-based lensless imaging", Optics Letters, vol. 47, No. 7, Apr. 1, 2022, pp. 1843-1846. (4 pages total).

Dosovitskiy, Alexey et al., "An Image is Worth 16×16 Words: Transformers for Image Recognition at Scale", ICLR 2021, arXiv:2010.11929v2 [cs.CV], Jun. 3, 2021. (22 pages total).

Vaswani, Ashish et al., "Attention Is All You Need", 31st Conference on Neural Information Processing Systems (NIPS 2017), 2017. (11 pages total).

Cannon et al., "Coded aperture imaging: many holes make light work", Optical Engineering, Society of Photo-optical Instrumentation Engineers, May 1, 1980, pp. 283-289, vol. 19, XP001092857.

Communication dated Nov. 21, 2024, issued by European Patent Office in European Patent Application No. 24179196.1.

* cited by examiner

LENSLESS IMAGING SYSTEM, METHOD OF MANUFACTURING LENSLESS IMAGING SYSTEM, AND ELECTRONIC APPARATUS

CROSS-REFERENCE TO RELATED APPLICATION(S)

This application is based on and claims priority to Korean Patent Application No. 10-2023-0178723, filed on Dec. 11, 2023, in the Korean Intellectual Property Office, the disclosure of which is incorporated herein by reference in its entirety.

BACKGROUND

1. Field

The disclosure relates to a lensless imaging system and a method of manufacturing the same.

2. Description of Related Art

An imaging system generally includes an image sensor chip including a driving circuit, packaging covering the image sensor chip, a light incident window in the packaging, a wavelength filter above the light incident window, and a lens system above the packaging. A typical lens system includes a lens, thus requiring a space necessary for light to travel, and several lenses may be combined, since a single lens may be insufficient to generate an image with a resolution required for a front surface of the sensor chip, such that the form factor of the imaging system becomes larger. Particularly, inexpensive materials cannot be used in a long-wave infrared (LWIR) imaging system, leading to an increase in cost.

Recently, in order to simplify the optical system to reduce the size and cost of the optical system, there has been proposed a lensless imaging system in which a coded mask is used instead of an imaging lens. In terms of hardware, a coded mask having a thin, planar shape is used to replace a lens assembly, such that an object image may not be directly captured, and the object image is reconstructed using a calculation algorithm. Depending on a shape of the point spread function (PSF) for parallel light incident and captured on an image sensor, the shape of a coded mask may be classified into two categories: curved line pattern and dot pattern. Even in the case of using the coded mask providing PSF in the curved line pattern and the dot pattern, the incident light is still diffused due to the properties of the coded mask, such that the intensity of light reaching each pixel of the sensor may be reduced compared to a related art lens optical system.

SUMMARY

Provided is a lensless imaging system capable of improving single quality by forming multiple domain patterns on a coded mask.

Additional aspects will be set forth in part in the description which follows and, in part, will be apparent from the description, or may be learned by practice of the presented embodiments of the disclosure.

According to an aspect of the disclosure, a lensless imaging system may include a coded mask including at least one domain, and an image sensor configured to receive light that passes through the coded mask and generate an electrical signal for image generation based on the received light, where each of the at least one domain includes a plurality of sub-domains provided in a first pattern, each of the plurality of sub-domains includes a second pattern, and the plurality of sub-domains are configured to deflect incident light based on a combination of the first pattern and the second pattern.

The coded mask may be configured to change a phase or a transmittance of the incident light.

The incident light may include long-wave infrared (LWIR) light.

The first pattern may include at least one of a random dot pattern and a curved line pattern.

The second pattern may include a meta-blazed grating pattern.

At least one of a deflection angle of light and a deflection direction of may be is varied for each sub-domain of the plurality of sub-domains.

A magnitude of the deflection angle may be proportional to a distance between a center of each sub-domain of the plurality of sub-domains and a center of a domain of the at least one domain to which the each sub-domain of the plurality of sub-domains corresponds.

The deflection direction may be from a center of each sub-domain of the plurality of sub-domains toward a center of a domain of the at least one domain to which the each sub-domain of the plurality of sub-domains corresponds.

The at least one domain may include a plurality of domains, and each domain of the plurality of domains may have an independent point spread function (PSF).

The coded mask may have a planar shape being less than 1 mm in thickness.

The image sensor may include at least one of a complementary metal-oxide semiconductor (CMOS) image sensor and a bolometer.

The image sensor may include a controller including a reconstruction algorithm configured to reconstruct an image based on the electrical signal generated by the image sensor.

The reconstruction algorithm may include a neural network-based deep learning algorithm.

According to an aspect of the disclosure, a method of manufacturing a lensless imaging system may include forming an image sensor on a substrate and forming a coded mask such that the coded mask faces one surface of the image sensor, the coded mask including at least one domain, where each of the at least one domain includes a plurality of sub-domains, and where the forming of the coded mask includes forming the plurality of sub-domains in a first pattern and forming a second pattern on each sub-domain of the plurality of sub-domains the respective sub-domains, such that the plurality of sub-domains are configured to deflect incident light based on a combination of the first pattern and the second pattern.

The first pattern may include at least one of a random dot pattern and a curved line pattern.

The second pattern may include a meta-blazed grating pattern.

The second pattern may be formed by varying at least one of a deflection angle of light and a deflection direction of light for each sub-domain of the plurality of sub-domains.

A magnitude of the deflection angle may be proportional to a distance between a center of each sub-domain of the plurality of sub-domains and a center of a domain of the at least one domain to which the each sub-domain of the plurality of sub-domains corresponds.

The deflection direction may be from a center of each sub-domain of the plurality of sub-domains toward a center of a domain of the at least one domain to which the each sub-domain of the plurality of sub-domains corresponds.

According to an aspect of the disclosure, an electronic apparatus may include a lensless imaging system configured to generate an image of a subject, and a processor configured to control the lensless imaging system, where the lensless imaging system includes a coded mask including at least one domain and an image sensor configured to receive light that passes through the coded mask and generate an electrical signal for image generation based on the received light, where each of the at least one domain includes a plurality of sub-domains provided in a first pattern, each of the plurality of sub-domains includes a second pattern, and the plurality of sub-domains are configured to deflect incident light based on a combination of the first pattern and the second pattern.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
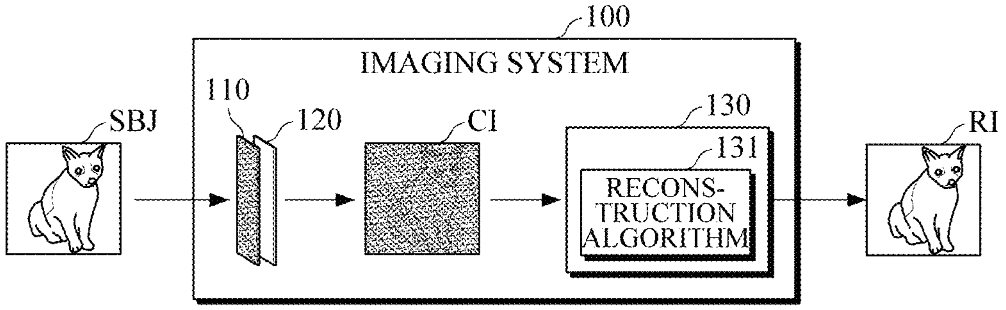
FIG. 1 is a block diagram illustrating a lensless imaging system according to some embodiments of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The embodiments described below are merely exemplary, and various modifications are possible from these embodiments. In the following drawings, the same reference numerals refer to the same components, and the size of each component in the drawings may be exaggerated for clarity and convenience of description.

In the following description, when a component is referred to as being "above" or "on" another component, it may be directly on an upper, lower, left, or right side of the other component while making contact with the other component or may be above an upper, lower, left, or right side of the other component without making contact with the other component.

Terms such as first, second, etc. may be used to describe various components, but are used only for the purpose of distinguishing one component from another component. These terms do not limit the difference in the material or structure of the components.

The terms of a singular form may include plural forms unless otherwise specified. In addition, when a certain part "includes" a certain component, it means that other components may be further included rather than excluding other components unless otherwise stated.

In addition, terms such as "unit" and "module" described in the specification may indicate a unit that processes at least one function or operation, and this may be implemented as hardware or software, or may be implemented as a combination of hardware and software.

The use of the term "the" and similar designating terms may correspond to both the singular and the plural.

Operations of a method may be performed in an appropriate order unless explicitly described in terms of order. In addition, the use of all illustrative terms (e.g., etc.) is merely for describing technical ideas in detail, and the scope is not limited by these examples or illustrative terms unless limited by the claims.

FIG. 1 is a block diagram illustrating a lensless imaging system according to some embodiments of the present disclosure.

Referring to FIG. 1, a lensless imaging system 100 includes a coded mask 110, an image sensor 120, and a controller 130.

The coded mask 110 may be disposed in front of the image sensor 120 and is formed in a specific pattern exhibiting optical properties required for image reconstruction. Information about the specific pattern formed on the coded mask 110 may be related to phase information of incident light that enters by being scattered or reflected from a subject SBJ, and may be used in the process of reconstructing an initial image (CI), generated by the image sensor 120, into a final image (RI). The incident light may be long-wave infrared (LWIR) light, visible light, etc., but is not limited thereto.

The pattern formed on the coded mask 110 may be a pattern for changing the transmittance of light passing through the coded mask 110, or a pattern for changing the phase of the transmitted light. The light passing through the coded mask 110 may be dispersed or scattered to enter the image sensor 120. A plurality of coded masks 110 may be disposed in front of the image sensor 120. All the plurality of coded masks 110 may have the same pattern for changing the phase or transmittance, or if necessary, some of the coded masks 110 may have the pattern for changing the phase of light, and the remaining coded masks 110 may have the pattern for changing the transmittance.

As will be described below, the coded mask 110 may include one or more domains and one or more sub-domains for each domain. In embodiments where a plurality of domains are included, patterns of the sub-domains may be formed such that each domain may have an independent point spread function (PSF). Each sub-domain may be formed with a combination of a first pattern and a second pattern, which is different from the first pattern, and used for deflecting incident light. The first pattern may include a random dot pattern, a curved line pattern, etc., and the second pattern may include a meta-blazed grating pattern, but the patterns are not limited thereto. The second pattern for deflecting light at a specific deflection angle and/or in a deflection direction may be formed on each sub-domain. For example, a magnitude of deflection angle of each sub-domain may be proportional to a distance between the center of a corresponding sub-domain and the center of a domain to which the corresponding sub-domain belongs (i.e., corresponds). In addition, a deflection direction of each sub-domain may be from the center of each sub-domain toward the center of a domain to which each sub-domain belongs (i.e., corresponds).

The coded mask 110 may have a planar shape being less than 1 mm in thickness, such that the coded mask 110 has a substantially small thickness (e.g., near zero thickness). Accordingly, as opposed to related art lens systems, the imaging system according to embodiments of the present disclosure does not require a space necessary for light to travel, thereby reducing a total volume of the imaging system, and allowing for a more compact imaging system.

The image sensor 120 may generate an initial image CI of the subject SBJ by receiving light that passed through the coded mask 110, and converting the light into an electrical signal for image generation. The image sensor 120 may include a photoelectric conversion element (e.g., a photodiode). The image sensor 120 may include a complementary metal-oxide semiconductor (CMOS) image sensor (CIS) or a bolometer, but is not limited thereto. The image sensor 120 may include a sensor array including a plurality of electromagnetic wave sensors.

The controller 130 may drive and control the image sensor 120. The controller 130 may include a readout integrated circuit (IC) (ROIC). The ROIC may include a memory (e.g., a buffer memory, etc.) and/or an image signal processor.

The controller 130 may include a reconstruction algorithm 131 for reconstructing the initial image CI, generated by the image sensor 120, into a final image RI. In some embodiments, the reconstruction algorithm 131 may be included in the image sensor 120. The final image RI reconstructed using the reconstruction algorithm 131 may be a two-dimensional (2D) or three-dimensional (3D) image of the subject SBJ to be acquired. The reconstruction algorithm 131 may include a neural network-based algorithm. The reconstruction algorithm 131 may be pre-trained based on deep learning using a plurality of subjects and images reconstructed by the reconstruction algorithm as training data, so as to minimize loss of a loss function. In this case, the loss function may include, intersection over union (IoU), binary cross entropy (BCE), peak signal-to-noise ratio (PSNR), mean squared error (MSE), cross-entropy loss, log likelihood loss, frequency domain loss function, etc., but is not limited thereto.

Figure 2A:
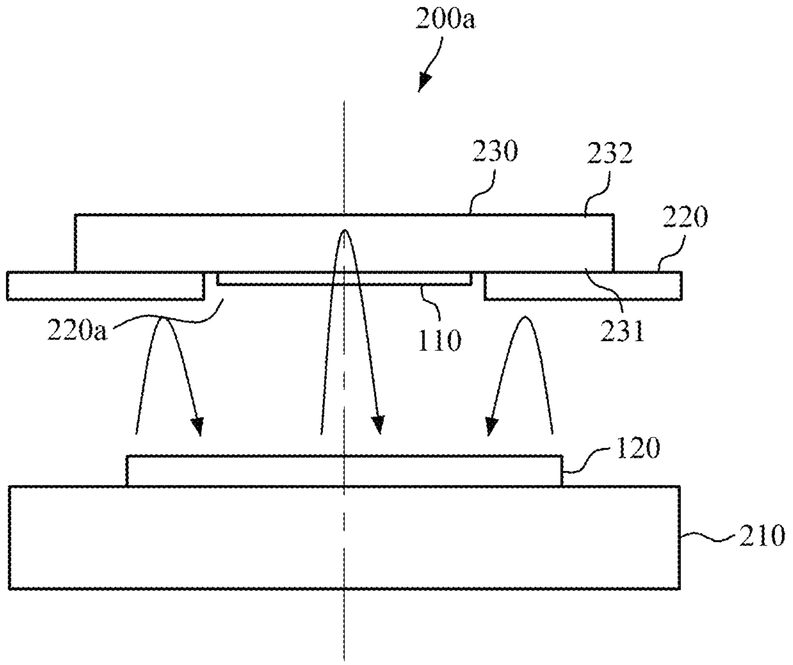
FIGS. 2A and 2B are diagrams illustrating a structure of a lensless imaging system according to some embodiments of the present disclosure.
Figure 2B:
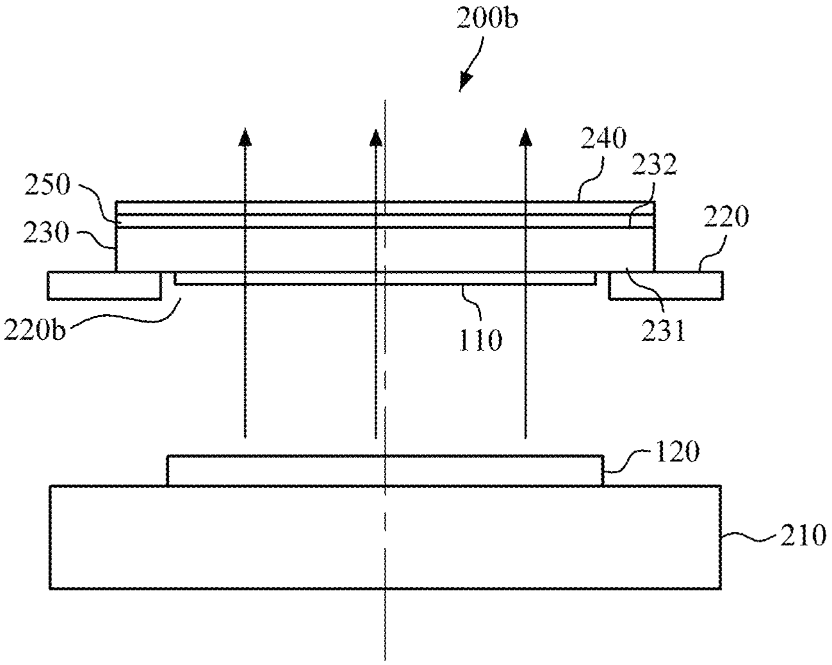

FIGS. 2A and 2B are diagrams illustrating a structure of a lensless imaging system according to some embodiments of the present disclosure.

Referring to FIGS. 2A and 2B, a lensless imaging systems 200*a* and 200*b* may include a substrate 210, an iris 220, and a window layer 230. The image sensor 120 and the controller 130 may be disposed on the substrate 210. The image sensor 120 and the controller 130 may be electrically connected to the substrate 210. The image sensor 120 may be flip-chip-bonded to the substrate 210. The iris 220 and the image sensor 120 may be parallel to each other with a predetermined distance therebetween. An aperture 220*a* of the iris 220 may be smaller than a width of the image sensor 120 as illustrated in FIG. 2A, an aperture 220*b* of the iris 220 may be greater than or equal to the width of the image sensor 120 as illustrated in FIG. 2B. The window layer 230 may be disposed on a second surface of the iris 220 (a surface opposite to a surface facing the image sensor 120). The window layer 230 and the image sensor 120 may be parallel to each other with a predetermined distance therebetween. The coded mask 110 may be disposed on a first surface 231 of the window layer 230 (a surface facing the image sensor 120), in which case the size of the coded mask 110 may be smaller than or equal to the size of the aperture 220*a*/220*b* of the iris 220. Various chips may be placed on the window layer 230.

Referring to FIG. 2B, an anti-reflective (AR) coating layer 240 may be formed on a second surface 232 of the window layer 230 (a surface opposite to the surface facing the image sensor 120). In addition, a filter layer 250 may be disposed to cover the second surface 232 of the window layer 230, in which case the AR coating layer 240 may be disposed to be in direct contact with one surface of the filter layer 250. The filter layer 250 may minimize noise light by transmitting only necessary light from the incident light and blocking the rest. An appropriate filter may be used as the filter layer 250 in consideration of the role or material of the window layer 230. The filter layer 250 and the varied size of the aperture 220*b* and the coded mask 110 as shown in FIG. 2B may be applied with or combined with the aspects and dimensions shown in FIG. 2A. For example, an AR coating layer 240 and filter layer 250 may be applied to the lensless imaging system 200*a* of FIG. 2A, and/or the size of the aperture 220*a* and coded mask 110 may be varied in FIG. 2A.

The window layer 230 may include a transparent material layer that does not absorb or substantially does not absorb incident light. A material of the window layer 230 may be selected in consideration of the type of incident light. For example, when light incident on the window layer is long-wavelength infrared (LWIR) light, the window layer 230 may include a silicon layer or a silicon wafer, but is not limited thereto. For example, when light incident on the window layer 230 is visible light, the window layer 230 may include a glass layer or a glass substrate, but is not limited thereto. A material of the coded mask 110 may vary depending on the role or material of the window layer 230.

As described above, the coded mask 110 may include one or more domains and one or more sub-domains for each domain, in which case patterns of each sub-domain are formed such that a magnitude of deflection angle of light may be proportional to a distance between the center of each sub-domain and the center of a domain to which the sub-domain belongs (i.e., corresponds), and a deflection direction may be toward the center of a domain to which each sub-domain belongs (i.e., corresponds). Thus, light energy diffused over the image sensor 120 may be concentrated into an area corresponding to the number of domains, thereby increasing the intensity per pixel. In this manner, even when noise occurs due to heat generated by the image sensor 120 itself or internal reflection (e.g., FIG. 2A), etc., the performance of a signal received by the image sensor 120 may be improved.

Figure 3A:
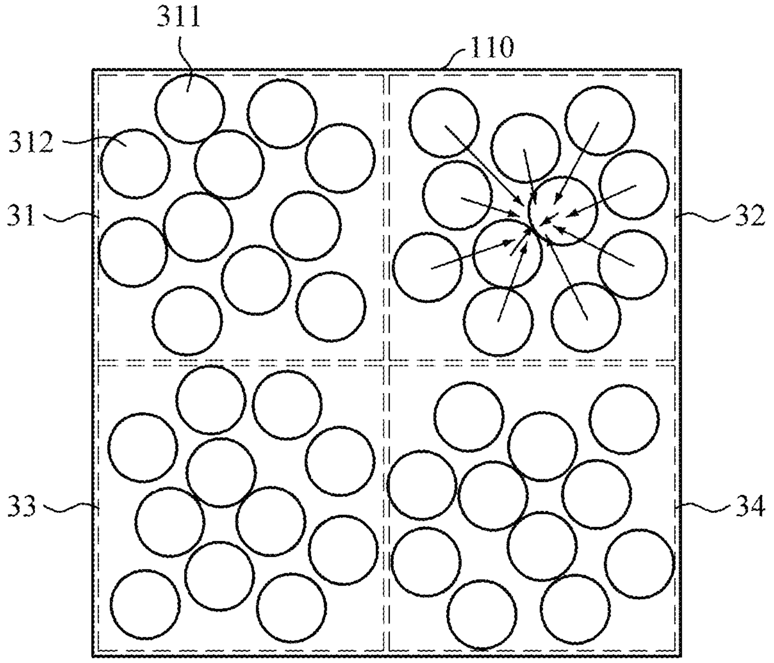
FIGS. 3A to 3C are diagrams illustrating patterns of a coded mask according to some embodiments of the present disclosure.
Figure 3B:
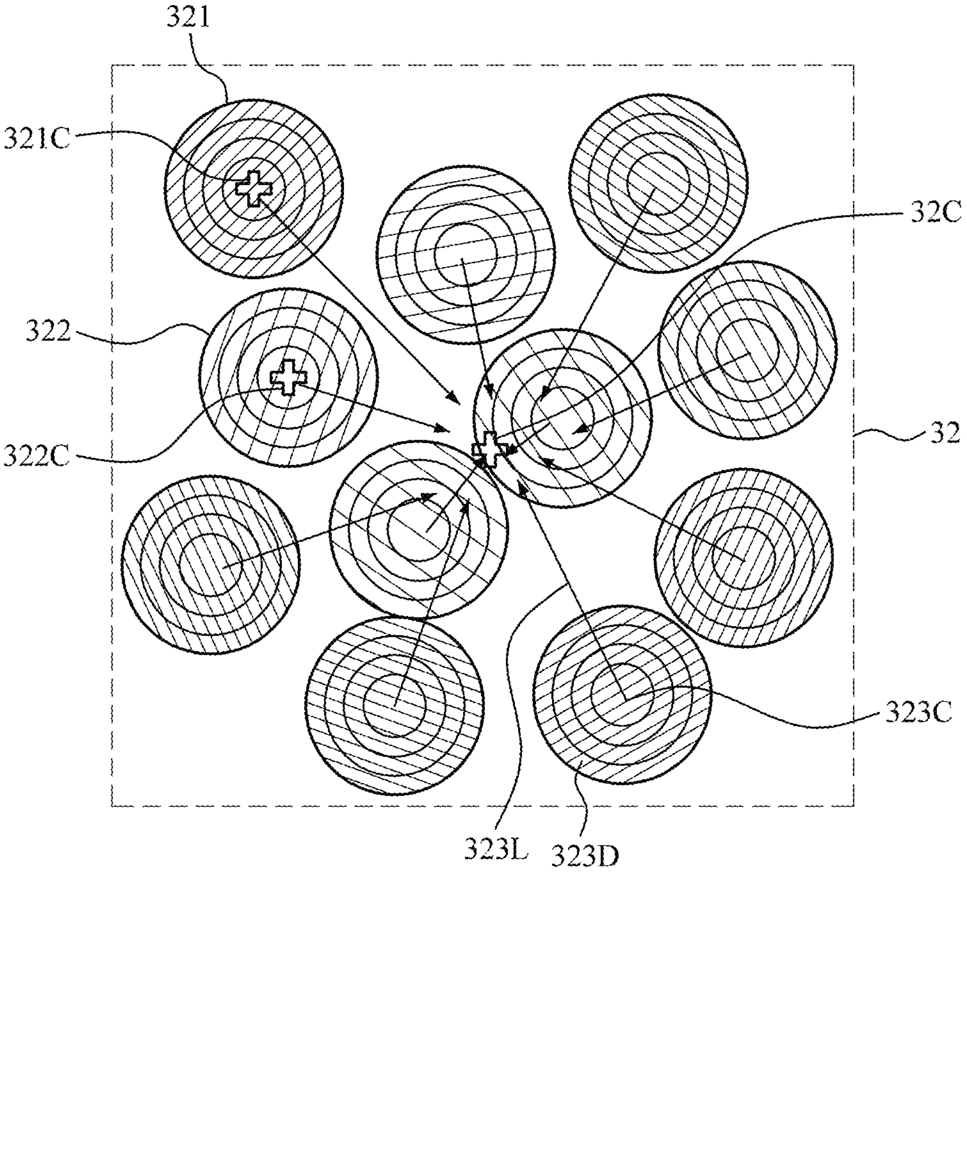
Figure 3C:
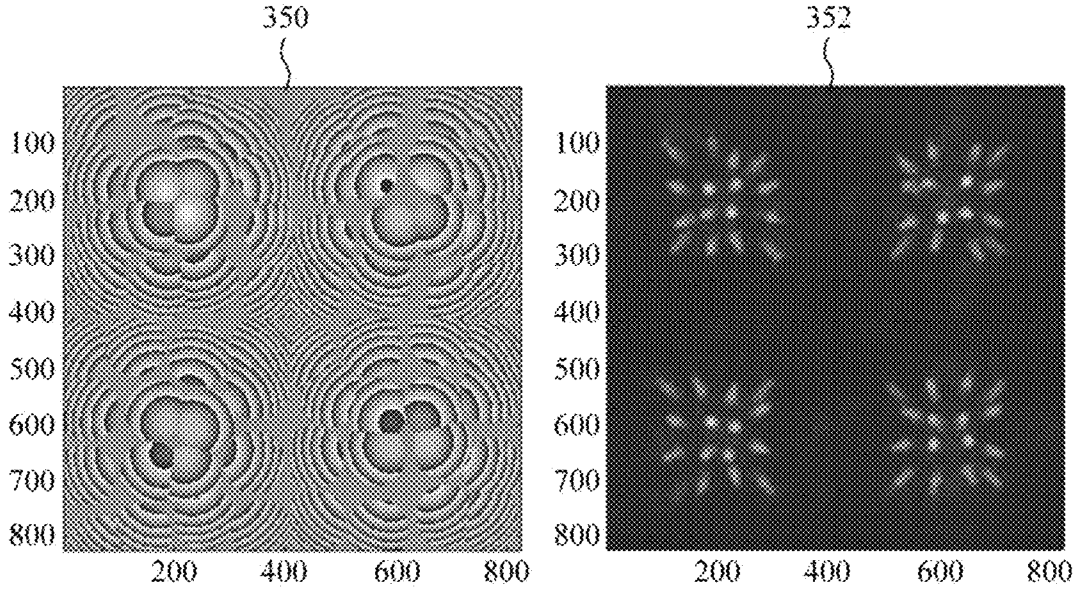

FIGS. 3A to 3C are diagrams illustrating patterns of a coded mask according to some embodiments of the present disclosure.

FIG. 3A illustrates an example in which the coded mask 110 is divided into four domains 31, 32, 33, and 34, and the respective domains 31, 32, 33, and 34 include 11 sub-domains which are formed, arranged, provided, etc., in a random dot pattern (e.g., a first pattern). For example, of the 11 sub-domains in domain 31, the sub-domains may include sub-domain 311 and sub-domain 312. Sub-domains in the random dot pattern are formed at different random positions of the respective domains 31, 32, 33, and 34, with the sub-domains located at different positions, thereby providing a combination of coded masks having an independent PSF for each of the domains 31, 32, 33, and 34. For example, the PSF in the random dot pattern may be defined as a spherical shape as shown in Equation (1), or as an aspherical shape expressed as a polynomial.

$$\varphi_L(x, y) = \frac{k}{2f}(x^2 + y^2) \quad (1)$$

$\varphi_L$(x, y) denotes a PSF value for spatial coordinates (x,y), k denotes a wave number, and f denotes a focal length.

FIG. 3B is an enlarged view of domain 32, in which the respective sub-domains in the domain 32 are formed, arranged, provided in or include a meta-blazed grating pattern (e.g., second pattern) composed of concentric circles and diagonal lines, in combination with the random dot pattern (e.g., first pattern). The meta-blazed grating pattern of each sub-domain may be formed with a specific deflection angle and a specific deflection direction.

For example, a sub-domain 321 located far away from a center 32C of the domain 32 (e.g., further away from the center 32C than sub-domain 322, further away from the center 32C than other sub-domains, having a center 321C that is further away from a center 32C of the domain 32 than other sub-domains, such as center 322C of sub-domain 322, etc.) may be formed with a finer grating of concentric circles and diagonal lines such that the deflection angle increases. By contrast, a sub-domain 322 located closer to the center 32C of the domain 32 than the sub-domain 321 may be formed with less fine grating of concentric circles and diagonal lines such that the deflection angle decreases. A deflection angle $\theta_B$ of the meta-blazed grating pattern of each sub-domain may be designed to be proportional to a distance between the center 32C of the domain and centers 321C and 322C of the sub-domains, as represented by Equation (2).

$$d\sin(\theta_B) = m\lambda \quad (2)$$

d denotes a period of the blazed grating. As the blazed grating period d decreases, deflection occurs at a greater angle. Accordingly, the magnitude of the period d may be set to be inversely proportional to a distance between the domain center and the sub-domain center. Further, m denotes a coefficient of a diffraction order, and λ denotes a wavelength.

In addition, the meta-blazed grating pattern may be formed such that a deflection direction of each sub-domain is from the center of each sub-domain toward the center of the domain to which each sub-domain belongs (i.e., corresponds). For example, diagonal lines of the blazed grating formed on each of the sub-domains 321 and 322 may be formed to be perpendicular to a straight line connecting the centers 321C and 322C of the respective sub-domains 321 and 322 and the center 32C of the domain 32. For example, diagonal line 323D of diagonal lines of the blazed grating formed in sub-domain 323 may be substantially perpendicular to a line 323L connecting the center 323C of the sub-domain 323 to the center 32C of the domain 32.

In FIG. 3C, image 350 illustrates an example of a structure of the coded mask 110 to which some embodiments of the present disclosure is applied, and image 352 illustrates a PSF of the image sensor 120 in the case where broadband light with a wavelength ranging from 8 μm to 12 μm is incident as parallel light. As shown in FIG. 3C, each sub-domain is formed in a meta-blazed grating pattern so as to have a specific deflection angle and a specific deflection direction, such that light energy to be imaged by the coded mask 110 may be concentrated on the center of each domain, thereby improving the intensity per pixel.

Figure 4A:
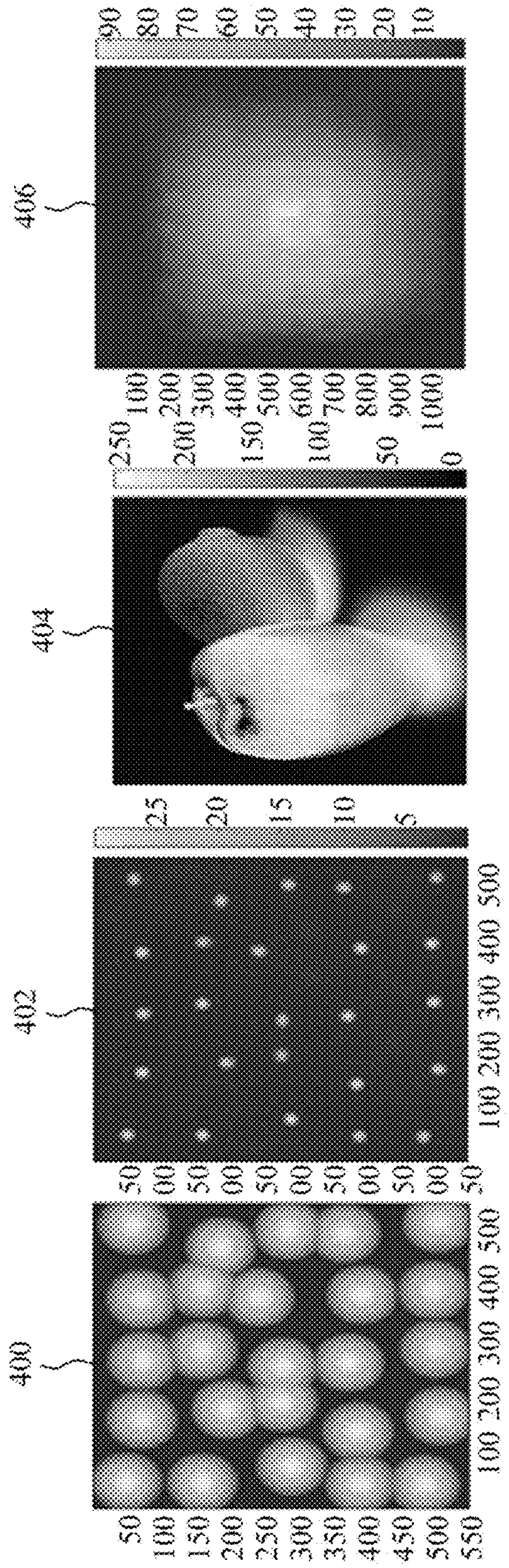
FIGS. 4A and 4B are diagrams illustrating comparison of simulation results of a related art lensless imaging system and a lensless imaging system according to some embodiments of the present disclosure.
Figure 4B:
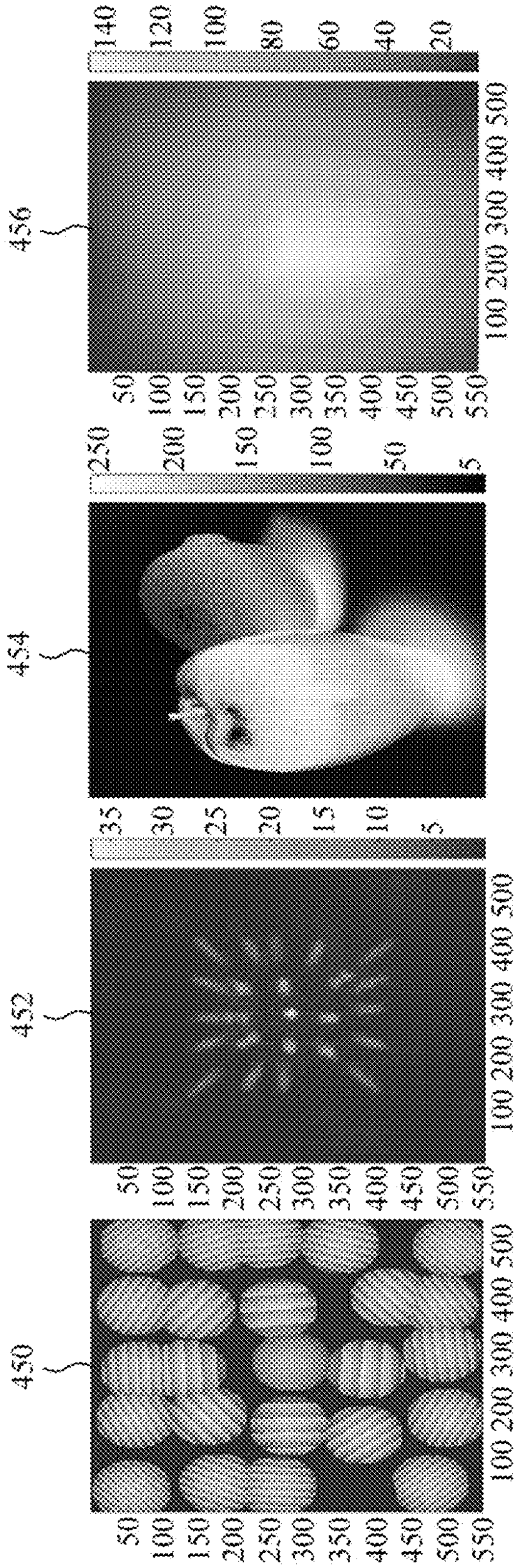

FIGS. 4A and 4B are diagrams illustrating comparison of simulation results of a related art lensless imaging system and a lensless imaging system according to some embodiments of the present disclosure. In particular, FIG. 4A is a diagram illustrating a simulation result of images measured by an image sensor using a related art lensless mask structure having only a random dot pattern, and FIG. 4B is a diagram of a simulation result of images measured by an image sensor using a lensless mask structure having a random dot pattern and a meta-blazed grating pattern according to some embodiments of the present disclosure. In FIG. 4A, image 400 illustrates a phase pattern of a lensless mask, image 402 illustrates simulation of PSF measured in the image sensor when parallel light is incident, image 404 illustrates a subject image, and image 406 illustrates image simulation of the measured subject image. In FIG. 4B, image 450 illustrates a phase pattern of a lensless mask, image 452 illustrates simulation of PSF measured in the image sensor when parallel light is incident, image 454 illustrates a subject image, and image 456 illustrates image simulation of the measured subject image. As shown in FIGS. 4A and 4B, it can be seen that a maximum amount of light per pixel for a sensor image (406 of FIG. 4A) is approximately 90 in the typical mask structure, but a maximum amount of light per pixel for a sensor image (450 of FIG. 4B) is approximately 140 in the mask structure according to embodiments of the present disclosure, thereby exhibiting an improved performance.

Figure 5:
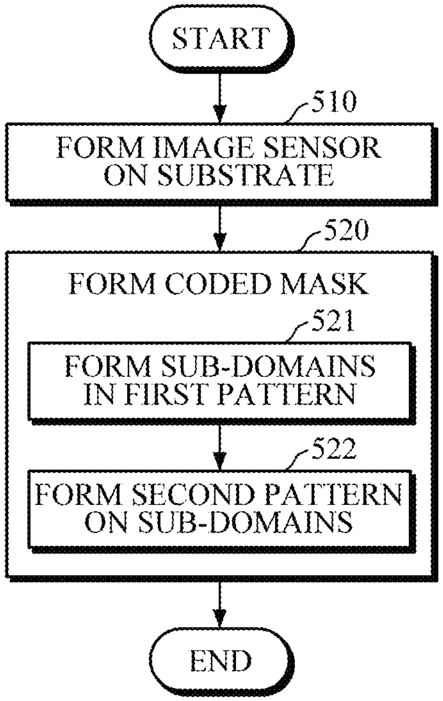
FIG. 5 is a flowchart illustrating a method of manufacturing a lensless imaging system according to some embodiments of the present disclosure.

FIG. 5 is a flowchart illustrating a method of manufacturing a lensless imaging system according to some embodiment of the present disclosure.

Referring to FIG. 5, an image sensor may be formed on a substrate in operation 510. The image sensor may be directly formed on the substrate by flip-bonding, deposition, and/or growth. The image sensor may be pre-formed outside the substrate, and then mounted on one surface of the substrate. Before or after the image sensor is formed on one surface of the substrate, a controller for driving and controlling the image sensor may be provided for the substrate. For example, the controller may be included in the substrate or may be formed on one surface of the substrate. Wiring for electric connection may be formed between the controller and the image sensor.

Then, a coded mask, including one or more domains and one or more sub-domains for each domain, may be formed to face one surface of the image sensor in operation 520. For example, after preparing a window layer using a material transparent to visible light and/or LWIR rays, the coded mask may be formed on a first surface the window layer. A filter layer and an AR coating layer may be sequentially stacked on a second surface of the window layer. The forming of the coded mask in operation 520 may include forming the sub-domains in a first pattern operation 521 and forming a second pattern on each sub-domain for deflecting incident light in operation 522. The first pattern may include a random dot pattern, a curved line pattern, etc., and the second pattern may include a meta-blazed grating pattern for deflecting light at a specific deflection angle and/or in a deflection direction. For example, a magnitude of deflection angle for each sub-domain may be designed to be proportional to a distance between the center of a corresponding sub-domain and the center of a domain to which the corresponding sub-domain belongs (i.e., corresponds), and a deflection direction may be designed to be from the center of each sub-domain toward the center of the domain to which each sub-domain belongs (i.e., corresponds).

Figure 6:
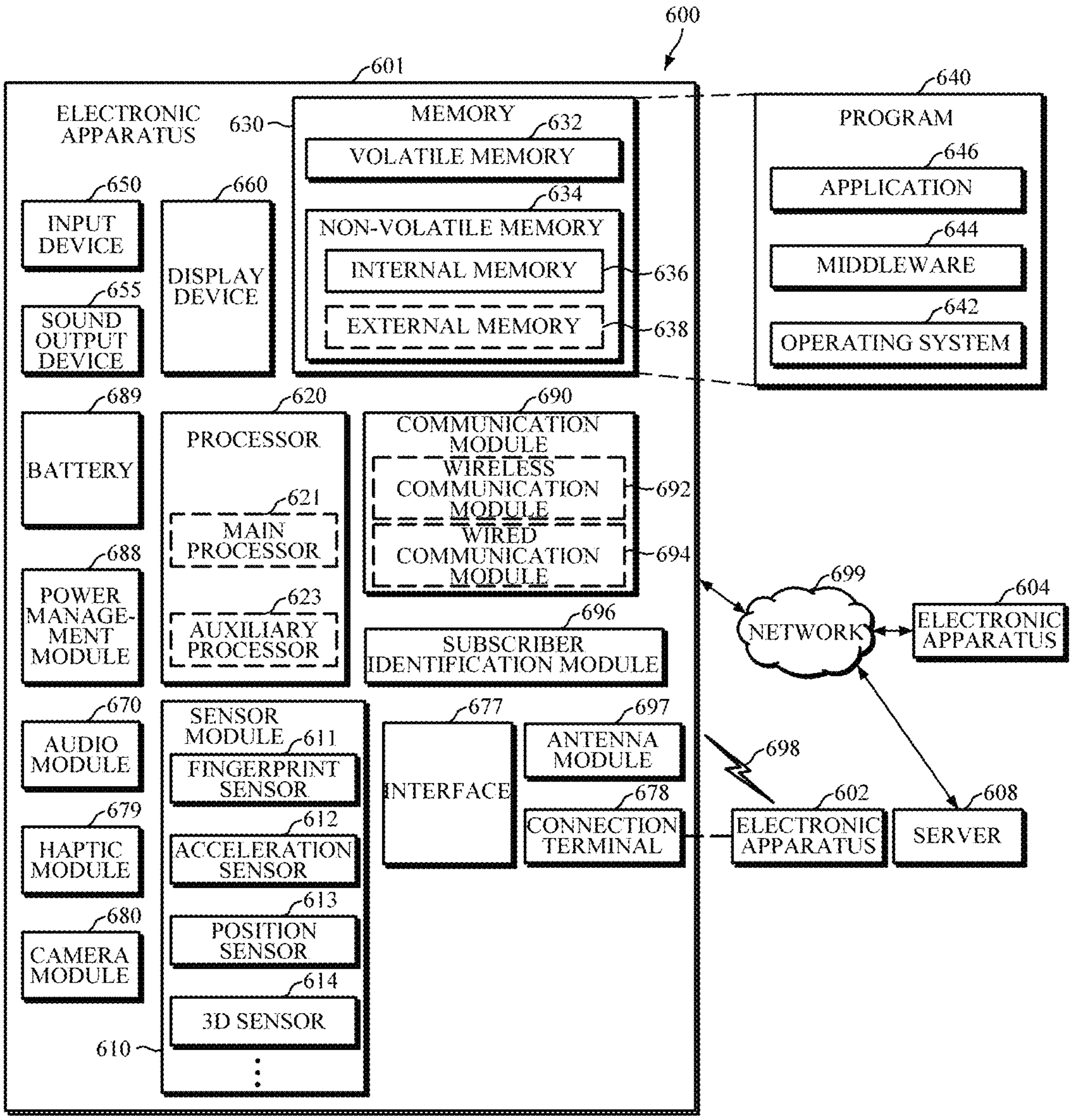
FIG. 6 is a block diagram illustrating a configuration of an electronic apparatus including a lensless imaging system according to some embodiments of the present disclosure.

FIG. 6 is a block diagram illustrating a configuration of an electronic apparatus including a lensless imaging system according to some embodiments of the present disclosure.

The electronic apparatus may include, for example, smart phones, wearable devices, augmented reality and virtual reality (VR) devices, Internet of Things (IoT) devices, home appliances, tablet personal computers (PCs), personal digital assistants (PDAs), portable multimedia players (PMPs), navigations, drones, robots, unmanned vehicles, autonomous vehicles, advanced driver assistance systems (ADAS), etc., but is not limited thereto.

Referring to FIG. 6, an electronic apparatus 601 in a network environment 600 may include various devices and modules as illustrated herein.

The electronic device 601 includes a processor 620, a memory 630, an input device 650, a sound output device 655, a display device 660, an audio module 670, a sensor module 610, an interface 677, a haptic module 679, a camera module 680, a power management module 688, a battery 689, a communication module 690, a subscriber identification module 696, and/or an antenna module 697. In some embodiments, at least one of the components (e.g., display device 660, etc.) may be omitted from the electronic device 601, and one or more other components may be added in the electronic device 601.

The processor 620 may execute, for example, software (e.g., a program 640, etc.) to control at least one or more other components (e.g., a hardware or software component, etc.) of the electronic device 601 connected to the processor 620, and may perform various data processing or computation. According to an example embodiment, as part of the data processing or computation, the processor 620 may load a command or data received from another component (e.g., the sensor module 610, the communication module 690, etc.) in a volatile memory 632, process the command or the data stored in the volatile memory 632, and store resulting data in a non-volatile memory 634. The processor 620 may generate a master clock for synchronization of operations of the components, and may provide the master clock to, for example, the pixel controller.

The processor 620 may include a main processor 621 (e.g., a central processing unit (CPU) or an application processor (AP), etc.), and an auxiliary processor 623 (e.g., a graphics processing unit (GPU), an image signal processor (ISP), a sensor hub processor, or a communication processor (CP), etc.) that is operable independently from, or in conjunction with, the main processor 621. The auxiliary processor 623 may be adapted to consume less power than the main processor 621, or to be specific to a specified function. The auxiliary processor 623 may control at least some of functions or states related to at least one component (e.g., the display device 660, the sensor module 610, the communication module 690, etc.) among the components of the electronic device 601, instead of the main processor 621 while the main processor 621 is in an inactive state (e.g., sleep state), or together with the main processor 621 while the main processor is in an active state (e.g., application execution state). The auxiliary processor 623 (e.g., an image signal processor, a communication processor, etc.) may be implemented as part of another component (e.g., the camera module 680, the communication module 690, etc.) functionally related to the auxiliary processor 623.

The memory 630 may store various data required for at least one component (e.g., the processor 620, the sensor module 610, etc.) of the electronic device 601. The various data may include, for example, software (e.g., the program 640, etc.) and input data or output data for a command related thereto. The memory 630 may include a volatile memory 632 and/or a non-volatile memory 634. The non-volatile memory 634 may include a internal memory 636 and/or an external memory 638.

The program 640 may be stored as software in the memory 630, and may include, for example, an operation system (OS) 642, middleware 644, and/or an application 646.

The input device 650 may receive a command or data to be used by another component (e.g., the processor 620, etc.) of the electronic device 601, from an external source (e.g., a user, etc.) of the electronic device 601. The input device 650 may include, for example, a microphone, a mouse, a keyboard, or a digital pen (e.g., a stylus pen, etc.).

The sound output device 655 may output sound signals to the outside of the electronic device 601. The sound output device 655 may include, for example, a speaker and/or a receiver. The speaker may be used for general purposes, such as playing multimedia or playing record, and the receiver may be used for incoming calls. The receiver may be implemented separately from, or as part of, the speaker.

The display device 660 may visually provide information to the outside of the electronic device 601. The display device 660 may include, for example, a display, a hologram device, or a projector and control circuitry to control a corresponding one of the display, hologram device, and projector. The display device 660 may include touch circuitry adapted to detect a touch, and/or sensor circuitry (e.g., pressure sensor, etc.) adapted to measure the intensity of force incurred by the touch.

The audio module 670 may convert a sound into an electrical signal or vice versa. The audio module 670 may obtain the sound via the input device 650, or may output the sound via the sound output device and/or a headphone of an external electronic device (e.g., electronic device 602, etc.) directly or wirelessly connected to the electronic device 601.

The sensor module 610 may detect an operating state (e.g., power, temperature, etc.) of the electronic device 601 or an external environment state (e.g., a state of a user, etc.), and may generate an electrical signal or a data value corresponding to the detected state. The sensor module 610 may include, for example, a fingerprint sensor 611, an acceleration sensor 612, a position sensor 613, a 3D sensor 614, a gesture sensor, a gyro sensor, an atmospheric pressure sensor, a magnetic sensor, a grip sensor, a proximity sensor, a color sensor, an infrared (IR) sensor, a biometric sensor, a temperature sensor, a humidity sensor, or an illuminance sensor.

The interface 677 may support one or more specified protocols used by the electronic device 601 to be directly or wirelessly connected to other electronic device (e.g., electronic device 602, etc.). The interface 677 may include, for example, a high definition multimedia interface (HDMI), a universal serial bus (USB) interface, a secure digital (SD) card interface, and/or an audio interface.

A connection terminal 678 may include a connector via which the electronic device 601 may be physically connected to the external electronic device (e.g., electronic device 602, etc.). The connection terminal 678 may include, for example, a HDMI connector, a USB connector, a SD card connector, and/or an audio connector (e.g., headphone connector, etc.).

A haptic module 679 may convert an electrical signal into a mechanical stimulus (e.g., vibration, motion, etc.) or electrical stimulus which may be recognized by a user by tactile sensation or kinesthetic sensation. The haptic module 679 may include, for example, a motor, a piezoelectric element, and/or an electric stimulator.

A camera module 680 may capture still images and moving images. For example, the camera module 680 may include one of the above imaging systems 100, 200*a*, and 200*b*. The camera module 680 may include at least one coded mask, an image sensor, an image signal processor, and/or a flash.

A power management module 688 may manage power supplied to the electronic apparatus 601. The power management module 688 may be implemented as part of a power management integrated circuit (PMIC).

A battery 689 may supply power to components of the electronic apparatus 601. The battery 689 may include a non-rechargeable primary cell, a rechargeable secondary cell, and/or a fuel cell.

A communication module 690 may support establishment of a direct (e.g., wired) communication channel and/or a wireless communication channel between the electronic apparatus 601 and other electronic apparatus (electronic apparatus 602, electronic apparatus 604, server 608, etc.), and performing of communication via the established communication channel. The communication module 690 may include one or more communication processors that operate independently from the processor 620 (application processor, etc.) and support direct communication and/or wireless communication. The communication module 690 may include a wireless communication module 692 (a cellular communication module, a short-range wireless communication module, a global navigation satellite system (GNSS) communication module, etc.), and/or a wired communication module 694 (local area network (LAN) communication module, a power line communication module, etc.). Among these communication modules, a corresponding communication module may communicate with other electronic apparatuses through a first network 698 (a short-range communication network, such as Bluetooth, WiFi Direct, or Infrared Data Association (IrDA)) or a second network 699 (a telecommunication network, such as a cellular network, the Internet, or a computer network (LAN, wide area network (WAN), etc.). These various types of communication modules may be integrated into a single chip and the like, or may be implemented as a plurality of separate chips. The wireless communication module 692 may identify and authenticate the electronic apparatus 601 in a communication network, such as the first network 698 and/or the second network 699, by using subscriber information (e.g., international mobile subscriber identifier (IMSI), etc.,) stored in a subscriber identification module 696.

An antenna module 697 may transmit or receive signals and/or power to and from the outside (other electronic apparatuses, etc.). The antenna module 697 may include a radiator having a conductive pattern formed on a substrate (printed circuit board (PCB), etc.). The antenna module 697 may include one or a plurality of antennas. When a plurality of antennas are included, an antenna suitable for a communication method used in a communication network, such as the first network 698 and/or the second network 699, may be selected from among the plurality of antennas by the communication module 690. Signals and/or power may be transmitted or received between the communication module 690 and another electronic apparatus through the selected antenna. In addition to the antenna, other components (such as RFIC) may be included as part of the antenna module 697.

Some of the components may be connected to each other through communication methods between peripheral devices (bus, general purpose input and output (GPIO), serial peripheral interface (SPI), mobile industry processor interface (MIPI), etc.) and signals (commands, data, etc.) may be interchangeable. Commands or data may be transmitted or received between the electronic apparatus 601 and the external electronic apparatus 604 through the server 608 connected to the second network 699. The other electronic apparatuses 602 and 604 may be of the same type as or a different type from that of the electronic apparatus 601. All or part of operations executed in the electronic apparatus 601 may be executed in one or more of the other electronic apparatuses 602, 604, and 608. For example, when the electronic apparatus 601 needs to perform a function or service, the electronic apparatus 601 may request one or more other electronic apparatuses to perform part or all of the function or service instead of executing the function or service itself. One or more other electronic apparatuses receiving the request may execute an additional function or service related to the request, and transmit a result of the execution to the electronic apparatus 601. To this end, cloud computing, distributed computing, and/or client-server computing technologies may be used.

Figure 7:
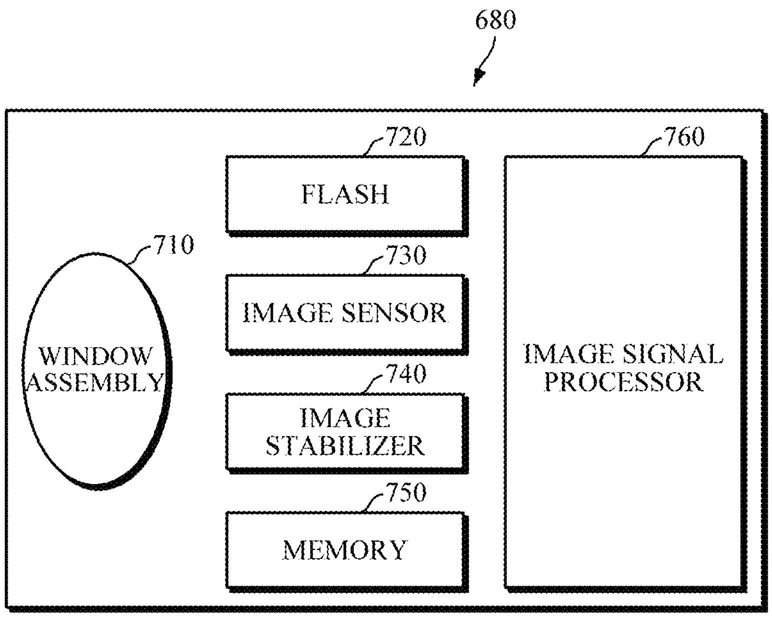
FIG. 7 is a block diagram illustrating a configuration of a camera module included in an electronic apparatus according to some embodiments of the present disclosure.

FIG. 7 is a block diagram illustrating a configuration of a camera module included in an electronic apparatus according to some embodiments of the present disclosure.

Referring to FIG. 7, the camera module 680 may include a window assembly 710, a flash 720, an image sensor 730, an image stabilizer 740, a memory 750 (buffer memory, etc.), and/or an image signal processor 760.

The window assembly 710 may collect light emitted from an object to be imaged, and may include the window layer 230, the coded mask 110, the filter layer 250, and the AR coating layer 240 which are described above. The camera module 680 may also include a plurality of window assemblies 710, in which case the camera module 680 may be a dual camera, a 360-degree camera, a spherical camera, and the like. Some of the plurality of window assemblies 710 may have the same optical characteristics (angle of view, focal length, auto focus, F number, optical zoom, etc.) or may have different optical characteristics. The window assembly 710 may include optical characteristics corresponding to a wide-angle lens or a telephoto lens.

The flash 720 may emit light used to increase an intensity of light emitted or reflected from an object. The flash 720 may include one or more light emitting diodes (LEDS) (red-green-blue (RGB) LED, white LED, infrared LED, ultraviolet LED, etc.), and/or a xenon lamp. The image sensor 730 may acquire an image corresponding to an object by converting light, emitted or reflected from the object and transmitted through the window assembly 710, into an electrical signal. The image sensor 730 may include the aforementioned image sensor 120.

The image stabilizer 740 may compensate for a negative effect of movement by moving the window assembly 710 or the image sensor 730 in a specific direction or adjusting the operation characteristics (adjustment of read-out timing, etc.) of the image sensor 730 in response to the movement of the camera module 680 or the electronic apparatus 701 including the same. The image stabilizer 740 may detect the movement of the camera module 680 or the electronic apparatus 601 by using a gyro sensor or an acceleration sensor arranged inside or outside the camera module 680 or the electronic apparatus 601. The image stabilizer 740 may be optically implemented.

The memory 750 may store some or all data of an image acquired through the image sensor 730 for a subsequent image processing operation. For example, when a plurality of images are acquired at high speed, the acquired original data (Bayer-Patterned data, high-resolution data, etc.) are stored in the memory 750, and after displaying only low-resolution images, the original data of the selected (user selection, etc.) images may be transmitted to the image signal processor 760. The memory 750 may be integrated into the memory 630 of the electronic apparatus 601, or may be configured as a separate memory that is operated independently. The memory 750 may also include a reconstruction algorithm for an image reconstruction operation to be performed in the image signal processor 760.

The image signal processor 760 may perform one or more image processing operations on an image acquired by the image sensor 730 or image data stored in the memory 750. The one or more image processing operations may include generating a depth map, three-dimensional modeling, generating a panorama, extracting feature points, image synthesis, image reconstruction, and/or image compensation (noise reduction, resolution adjustment, brightness adjustment, blurring, sharpening, softening, etc.). The image signal processor 760 may perform controlling (exposure time control or readout timing control, etc.) of components (image sensor 730, etc.) included in the camera module 680. The images processed by the image signal processor 760 may be stored in the memory 750 for further processing or may be provided to external components (memory 630, display device 660, electronic apparatus 602, electronic apparatus 604, server 608, etc.). The image signal processor 760 may be integrated into the processor 620 or may be configured as a separate processor that is operated independently from the processor 620. In embodiments where the image signal processor 760 is implemented as a separate processor from the processor 620, an image processed by the image signal processor 760 may be additionally processed by the processor 620, and then, displayed through the display device 660.

The electronic apparatus 601 may include a plurality of camera modules 680 each having different properties or functions. In this case, one of the plurality of camera modules 680 may be a wide-angle camera, and the other may be a telephoto camera. Similarly, one of the plurality of camera modules 680 may be a front camera and the other one may be a rear camera.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. Examples of the computer-readable recording medium include a read-only memory (ROM), a random access memory (RAM), a compact disc (CD) ROM (CD-ROM), a magnetic tape, a floppy disc, an optical data storage, and a carrier wave (e.g., data transmission through the Internet). The computer program product may be distributed in the form of a machine-readable storage medium (e.g., CD-ROM), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At least one of the devices, units, components, modules, units, or the like represented by a block or an equivalent indication in the above embodiments including, but not limited to, FIGS. 1, 6 and 7 may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein)

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A lensless imaging system comprising:

a coded mask comprising at least one domain; and an image sensor configured to:

receive light that passes through the coded mask; and generate an electrical signal for image generation based on the received light, wherein each of the at least one domain comprises a plurality of sub-domains provided in a first pattern, wherein each of the plurality of sub-domains comprises a second pattern, wherein the plurality of sub-domains are configured to deflect incident light based on a combination of the first pattern and the second pattern, and wherein the second pattern comprises a number of gratings that vary in proportion to a distance of an individual sub-domain from a center of a respective domain of the at least one domain.

2. The lensless imaging system of claim 1, wherein the coded mask is configured to change a phase or a transmittance of the incident light.

3. The lensless imaging system of claim 1, wherein the incident light comprises long-wave infrared (LWIR) light.

4. The lensless imaging system of claim 1, wherein the first pattern comprises at least one of a random dot pattern and a curved line pattern.

5. The lensless imaging system of claim 1, wherein the second pattern comprises a meta-blazed grating pattern.

6. The lensless imaging system of claim 5, wherein at least one of a deflection angle of light and a deflection direction of light is varied for each sub-domain of the plurality of sub-domains.

7. The lensless imaging system of claim 6, wherein a magnitude of the deflection angle is proportional to a distance between a center of each sub-domain of the plurality of sub-domains and a center of a domain of the at least one domain to which the each sub-domain of the plurality of sub-domains corresponds.

8. The lensless imaging system of claim 6, wherein the deflection direction is from a center of each sub-domain of the plurality of sub-domains toward a center of a domain of the at least one domain to which the each sub-domain of the plurality of sub-domains corresponds.

9. The lensless imaging system of claim 1, wherein the at least one domain comprises a plurality of domains, and wherein each domain of the plurality of domains has an independent point spread function (PSF).

10. The lensless imaging system of claim 1, wherein the coded mask has a planar shape being less than 1 mm in thickness.

11. The lensless imaging system of claim 1, wherein the image sensor comprises at least one of a complementary metal-oxide semiconductor (CMOS) image sensor and a bolometer.

12. The lensless imaging system of claim 1, further comprising a controller comprising a reconstruction algorithm configured to reconstruct an image based on the electrical signal generated by the image sensor.

13. The lensless imaging system of claim 12, wherein the reconstruction algorithm comprises a neural network-based deep learning algorithm.

14. A method of manufacturing a lensless imaging system, the method comprising:

forming an image sensor on a substrate; and forming a coded mask such that the coded mask faces one surface of the image sensor, the coded mask comprising at least one domain, wherein each of the at least one domain comprises a plurality of sub-domains, wherein the forming of the coded mask comprises:

forming the plurality of sub-domains in a first pattern; and forming a second pattern on each sub-domain of the plurality of sub-domains the respective sub-domains, such that the plurality of sub-domains are configured to deflect incident light based on a combination of the first pattern and the second pattern, and wherein the second pattern comprises a number of gratings that vary in proportion to a distance of an individual sub-domain from a center of a respective domain of the at least one domain.

15. The method of claim 14, wherein the first pattern comprises at least one of a random dot pattern and a curved line pattern.

16. The method of claim 14, wherein the second pattern comprises a meta-blazed grating pattern.

17. The method of claim 16, wherein the second pattern is formed such that at least one of a deflection angle of light and a deflection direction of light is varied for each sub-domain of the plurality of sub-domains.

18. The method of claim 17, wherein a magnitude of the deflection angle is proportional to a distance between a center of each sub-domain of the plurality of sub-domains and a center of a domain of the at least one domain to which the each sub-domain of the plurality of sub-domains corresponds.

19. The method of claim 17, wherein the deflection direction is from a center of each sub-domain of the plurality of sub-domains toward a center of a domain of the at least one domain to which the each sub-domain of the plurality of sub-domains corresponds.

20. An electronic apparatus comprising:

a lensless imaging system configured to generate an image of a subject; and a processor configured to control the lensless imaging system, wherein the lensless imaging system comprises:

a coded mask comprising at least one domain; and an image sensor configured to:

receive light that passes through the coded mask; and generate an electrical signal for image generation based on the received light, wherein each of the at least one domain comprises a plurality of sub-domains provided in a first pattern, wherein each of the plurality of sub-domains comprises a second pattern, wherein the plurality of sub-domains are configured to deflect incident light based on a combination of the first pattern and the second pattern, and wherein the second pattern comprises a number of gratings that vary in proportion to a distance of an individual sub-domain from a center of a respective domain of the at least one domain.

* * * * *